United States Patent
Bax et al.

(10) Patent No.: US 12,086,832 B2
(45) Date of Patent: Sep. 10, 2024

(54) SYSTEMS AND METHODS FOR TARGETING ELECTRONIC CONTENT USING VIRTUAL TOKENS ON USER DEVICES

(71) Applicant: Yahoo Ad Tech LLC, New York, NY (US)

(72) Inventors: Eric Bax, Sierra Madre, CA (US); Charlotte Bax, New York, NY (US); Kimberly Williams, New York, NY (US); Nikki Thompson, New York, NY (US); Lisa Giaffo, New York, NY (US); Tanisha Sharma, New York, NY (US); Will Wagner, New York, NY (US); Melissa Gerber, New York, NY (US)

(73) Assignee: Yahoo Ad Tech LLC, New York, NY (US)

( * ) Notice: Subject to any disclaimer, the term of this patent is extended or adjusted under 35 U.S.C. 154(b) by 0 days.

(21) Appl. No.: 17/935,402

(22) Filed: Sep. 26, 2022

(65) Prior Publication Data
US 2024/0104602 A1    Mar. 28, 2024

(51) Int. Cl.
*G06Q 30/0251* (2023.01)
*G06Q 30/0241* (2023.01)

(52) U.S. Cl.
CPC ..... *G06Q 30/0257* (2013.01); *G06Q 30/0277* (2013.01)

(58) Field of Classification Search
CPC combination set(s) only.
See application file for complete search history.

(56) References Cited

U.S. PATENT DOCUMENTS

| | | | |
|---|---|---|---|
| 8,412,814 B2 * | 4/2013 | Pfeffer | G06F 15/16 709/224 |
| 2010/0153516 A1 * | 6/2010 | Weinberg | H04L 67/306 709/217 |

(Continued)

FOREIGN PATENT DOCUMENTS

| | | | | |
|---|---|---|---|---|
| CA | 3031615 A1 * | 7/2020 | | G06F 21/31 |
| JP | 6983705 B2 * | 12/2021 | | |

(Continued)

*Primary Examiner* — Marie P Brady
(74) *Attorney, Agent, or Firm* — Bookoff McAndrews, PLLC

(57) ABSTRACT

Methods are disclosed that include receiving electronic content data associated with an electronic content provider comprising: a content campaign identification associated with a virtual token, and provider-identified platform identifications that identify platforms on which the content campaign may be initiated; receiving input from the user comprising: a user identification, a virtual token identification, a campaign identification that identifies the content campaign associated with the virtual token, and user-identified platform identifications that identify the platforms on which the user consents to be targeted by the content campaign; determining, based on the received electronic content data and user data, the content campaign and platforms the user consents to; and generating a notification to initiate a content campaign targeting the user on the platforms on which the user consents to be targeted; and outputting the generated notification to the platforms on which the user consents to be targeted.

19 Claims, 8 Drawing Sheets

(56) References Cited

U.S. PATENT DOCUMENTS

| | | | | |
|---|---|---|---|---|
| 2012/0054143 | A1* | 3/2012 | Doig | G06Q 30/0243 |
| | | | | 706/47 |
| 2014/0067532 | A1* | 3/2014 | Nelson | G06Q 30/0257 |
| | | | | 705/14.53 |
| 2019/0080312 | A1* | 3/2019 | Yeager | G06Q 20/3229 |
| 2021/0243262 | A1* | 8/2021 | Dudmesh | H04L 67/535 |
| 2021/0390196 | A1* | 12/2021 | Lavine | H04L 63/102 |
| 2022/0318853 | A1* | 10/2022 | Blaikie, III | G06Q 30/0255 |
| 2022/0407702 | A1* | 12/2022 | Jakobsson | H04L 9/3231 |

FOREIGN PATENT DOCUMENTS

| | | | | | |
|---|---|---|---|---|---|
| WO | WO-2010034311 | A1 * | 4/2010 | | G06Q 30/02 |
| WO | WO-2020188349 | A1 * | 9/2020 | | G06F 16/2379 |
| WO | WO-2022204404 | A1 * | 9/2022 | | G06F 21/10 |

\* cited by examiner

SYSTEMS AND METHODS FOR TARGETING ELECTRONIC CONTENT USING VIRTUAL TOKENS ON USER DEVICES

TECHNICAL FIELD

The present disclosure relates generally to systems and methods for providing targeted electronic content. More particularly, and without limitation, the present disclosure relates to systems and methods for transmitting targeted electronic content to users using virtual tokens stored on user devices.

BACKGROUND

Due to the vast and increasing amount of traffic generated by users on the Internet, businesses continue to seek more effective means to advertise their goods and services online. For content providers or web publishers, the ability to monetize advertising opportunities while providing online content is an important factor in being able to sustainably provide this content. An important factor for optimal monetization of advertising opportunities in online content is to ensure high user interaction or high conversion rates of the advertising content. One of the challenges with display advertising is that, over time and regardless of the content, users can become conditioned to ignore ad placements, and ignore content that is of little or no interest to them. Accordingly, the likelihood that a user will view, listen to, or interact with an advertisement can sometimes continue to decrease.

One approach to retain target audience attention is to employ rich media advertisements, that is, advertisements that momentarily expand to cover some of the display space. Other approaches include interstitial windows that contain advertising content items that pop-up over displayed content. Additionally, advertising content may appear as a transparent screen over displayed content that is being viewed by a user. One approach of presenting advertisements is to enlarge advertising space compared to page content so that it is noticed. However, this approach may limit the amount of information that may be presented to a user, for example, in the case of mobile use. All of these approaches provide advertising content in a manner that is more visible and apparent to a user. However, some users can find these modes of advertising to be disruptive to their web browsing experience.

Online content providers strive to provide a positive user experience that enables them to maintain a sustained user base and therefore, be unable to generate sustainable and significant advertising revenue. Embodiments of the current disclosure may provide specified content to a user in lieu of standard advertising which allows for positive user interactions with the advertising content, which aids in preserving a sustainable user base.

SUMMARY

Various embodiments of the present disclosure relate generally to improving methods for providing targeted electronic content to users in in lieu of standard advertising. Each of the embodiments disclosed herein may include one or more of the features described in connection with any of the other disclosed embodiments.

According to some embodiments, computer-implemented methods for targeting content to a user in possession of a virtual token are disclosed. In one exemplary method, the method includes receiving, using at least one processor, electronic content data associated with an electronic content provider, the electronic content data comprising: a content campaign identification that identifies a content campaign associated with a virtual token, and provider-identified platform identifications that identify platforms on which the content campaign may be initiated; receiving, using the at least one processor, input from the user comprising user data associated with the user; the user data comprising: a user identification that identifies the user, a virtual token identification that indicates that the user is in possession of the virtual token associated with the content campaign, a campaign identification that identifies the content campaign associated with the virtual token, and user-identified platform identifications that identify the platforms on which the user consents to be targeted by the content campaign; determining, using the at least one processor, based on the received electronic content data and user data, the content campaign and platforms the user consents to; and generating, using the at least one processor, a notification to initiate a content campaign targeting the user on the platforms on which the user consents to be targeted; and outputting the generated notification to the platforms on which the user consents to be targeted.

According to some embodiments, systems are disclosed for targeting content to users in possession of a virtual token. One system includes a memory having processor-readable instructions stored therein and a processor configured to access the memory and execute the processor-readable instructions, which when executed by the processor configure the processor to perform a method. In one exemplary method, the method includes receiving, using at least one processor, electronic content data associated with an electronic content provider, the electronic content data comprising: a content campaign identification that identifies a content campaign associated with a virtual token, and provider-identified platform identifications that identify platforms on which the content campaign may be initiated; receiving, using the at least one processor, input from the user comprising user data associated with the user; the user data comprising: a user identification that identifies the user, a virtual token identification that indicates that the user is in possession of the virtual token associated with the content campaign, a campaign identification that identifies the content campaign associated with the virtual token, and user-identified platform identifications that identify the platforms on which the user consents to be targeted by the content campaign; determining, using the at least one processor, based on the received electronic content data and user data, the content campaign and platforms the user consents to; and generating, using the at least one processor, a notification to initiate a content campaign targeting the user on the platforms on which the user consents to be targeted; and outputting the generated notification to the platforms on which the user consents to be targeted.

According to some embodiments, systems are disclosed for providing specified content in lieu of standard advertising content to users in possession of a virtual token. One system includes a memory having processor-readable instructions stored therein and a processor configured to access the memory and execute the processor-readable instructions, which when executed by the processor configure the processor to perform a method. In one exemplary method, the method includes receiving, using at least one processor, electronic content data associated with an electronic content provider, the electronic content data comprising: a content campaign identification that identifies a content campaign associated with a virtual token, and provider-identified platform identifications that identify platforms on which the content campaign may be initiated; receiving, using the at least one processor, input from the user comprising user data associated with the user; the user data comprising: a user identification that identifies the user, a virtual token identification that indicates that the user is in possession of the virtual token associated with the content campaign, a campaign identification that identifies the content campaign associated with the virtual token, and user-identified platform identifications that identify the platforms on which the user consents to be targeted by the content campaign; determining, using the at least one processor, based on the received electronic content data and user data, the content campaign and platforms the user consents to; and generating, using the at least one processor, a notification to initiate a content campaign targeting the user on the platforms on which the user consents to be targeted; and outputting the generated notification to the platforms on which the user consents to be targeted.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate exemplary embodiments of the present disclosure and, together with the description, serve to explain the principles of the disclosure.

DETAILED DESCRIPTION

Figure 1:
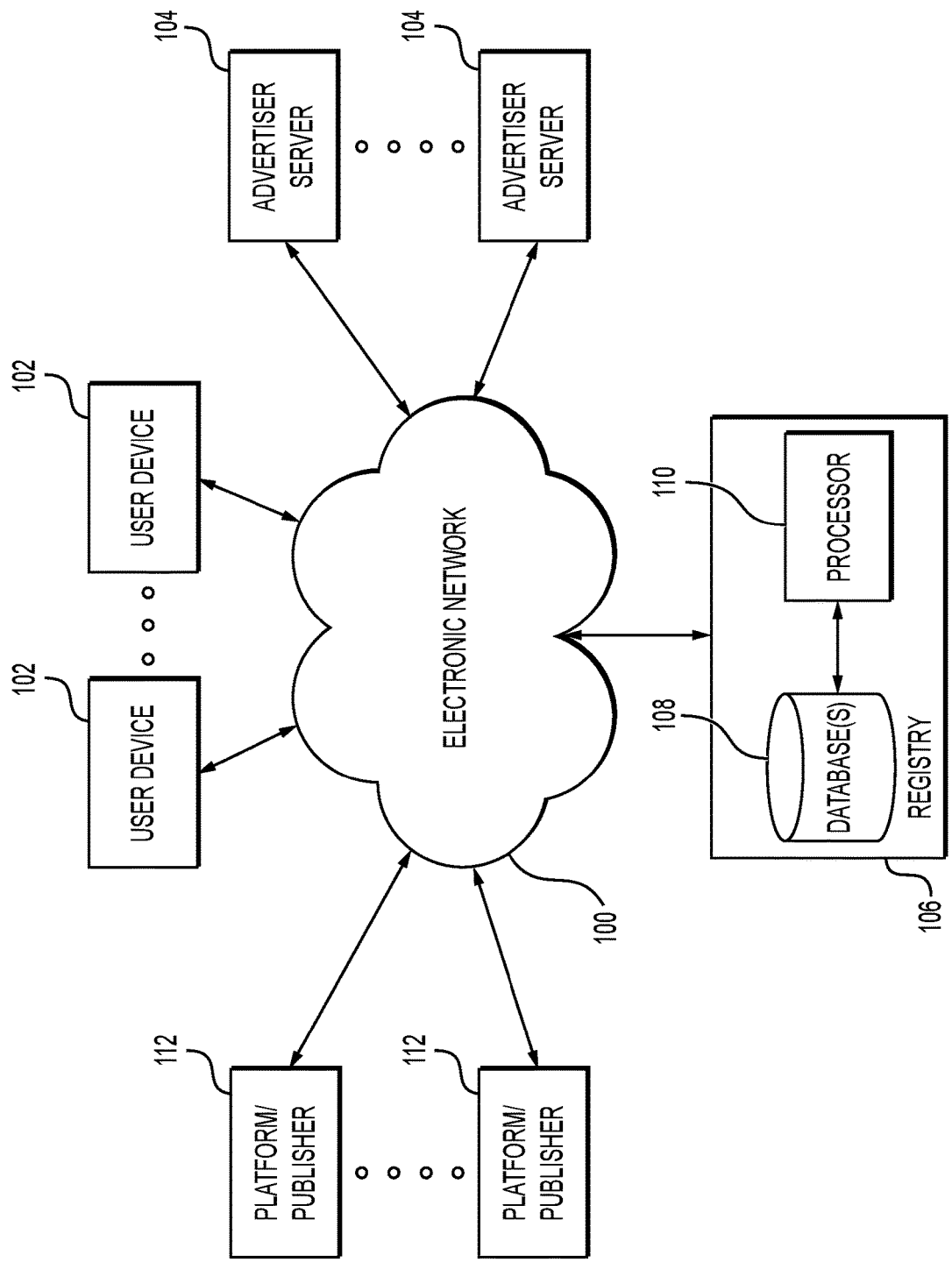
FIG. 1 shows a block diagram of an exemplary electronic network and online electronic content targeting environment for targeting content to a user, consistent with exemplary embodiments of the present disclosure.

The present disclosure describes systems and methods for targeting electronic content to a user who has demonstrated a proof of interest in the content by obtaining a virtual token offered from the electronic content provider.

For content providers or web publishers, the ability to monetize advertising opportunities while providing online content is an important factor in being able to sustainably provide this content. An important factor for optimal monetization of advertising opportunities in online content is to ensure high user interaction or high conversion rates of the advertising content. One of the challenges with display advertising is that, over time and regardless of the content, users can become conditioned to ignore ad placements, and ignore content that is of little or no interest to them. Accordingly, the likelihood that a user will view, listen to, or interact with an advertisement can sometimes continue to decrease. One approach to retain target audience attention is to employ rich media advertisements, that is, advertisements that momentarily expand to cover some of the display space. Online content providers strive to provide a positive user experience that enables them to maintain a sustained user base and therefore, be unable to generate sustainable and significant advertising revenue.

In one exemplary embodiment, a content provider may target their content to users who hold virtual tokens that have a limited supply and are indicative of a user's interest in the content available from the content provider. This content may be provided in lieu of standard advertising content in an online environment, including in the user interface of online platforms and publishers, collectively referred to as platforms. The user or viewer of online content may receive a virtual token as an invitation from a content provider, which may follow a proof of interest triggering event that indicates to the provider that the user or viewer may be interested in their content. The proof of interest triggering events may include purchasing tickets to an event, attendance at an event, purchasing an item, tagging (e.g., liking) of a particular topic on social media, etc. The user of online content may also receive the virtual token as a transfer from another user, or as an invitation if recommended by a specified number of other virtual token holders. The user may also mine the virtual token, for example, by finding a token identification that, combined with an identification for the content provider, hashes to a value with a specified number of trailing zeros. In all cases, the holder of a virtual token may be allowed to transfer the virtual token to other users, or may be issued a limited number of additional virtual tokens to share with other interested users.

Once a user is in possession of a virtual token, the user is prompted to select platforms or publishers, e.g., Yahoo, Facebook, Instagram, LinkedIn, nytimes.com, etc., where the user consents to being displayed specified content as part of a campaign related to the content provider in lieu of standard advertising. In this way, the user may opt out of standard advertising across a variety of platforms and publishers and instead see content that they have demonstrated interest in, as evidenced by possession of the virtual token. The content providers also benefit as providing specified content in lieu of standard advertising increases the likelihood that a user will view, listen to, or interact with an advertisement if they have demonstrated interest in the content. Furthermore, the holder of the virtual token may be granted access to preferred content that is not available to users that do not have access to the virtual token. In this way, the desirability of obtaining the virtual token and potential engagement with the content available to token holders will be increased.

This allows, for example, fans of a sports team who buy tickets to attend a game in person to see content and advertisements for the sports team on their preferred platforms. The content may be as simple as a display of the team's colors and logo, or may include pictures of players before the game and scores or highlights after the game. It also allows similar experiences for fans of a band who buy tickets to a concert, to be shown advertisements featuring the band, its music, and its album cover art, etc. These examples are not intended to be limiting but merely exemplary of the uses of this embodiment of the invention.

While principles of the current disclosure are described with reference to online content, it should be understood that the disclosure is not limited thereto. Rather, the systems and methods of the present disclosure may be used in any networked system with user interfaces to provide specified content to holders of virtual tokens related to the content providers. Reference will now be made in detail to the exemplary embodiments of the disclosure, examples of which are illustrated in the accompanying drawings. Wherever possible, the same reference numbers will be used throughout the drawings to refer to the same or like parts.

FIG. 1 is a schematic diagram of an exemplary network environment in which various user interfaces may display online content, according to an embodiment of the present disclosure. As shown in FIG. 1, the environment may include a plurality of user or client devices 102 that are communicatively coupled to each other as well as a plurality of server system 106 via an electronic network 100. Server systems 106 may also be referred to as registries. Electronic network 100 may include one or a combination of wired and/or wireless electronic networks. Network 100 may also include a local area network, a medium area network, and/or a wide area network, such as the Internet.

In one embodiment, each of user or client devices 102 may be any type of computing device configured to send and receive different types of content and data to and from various computing devices via network 100. Examples of such a computing device include, but are not limited to, a desktop computer or workstation, a laptop computer, a mobile handset, a personal digital assistant (PDA), a cellular telephone, a network appliance, a camera, a smart phone, an enhanced general packet radio service (EGPRS) mobile phone, a media player, a navigation device, a game console, a set-top box, or any combination of these or other types of computing devices having at least one processor, a local memory, a display (e.g., a monitor or touchscreen display), one or more user input devices, and a network communication interface. The user input device(s) may include any type or combination of input/output devices, such as a keyboard, touchpad, mouse, touchscreen, camera, and/or microphone.

In one embodiment, each of the user or client devices 102 may be configured to execute a web browser or mobile browser installed for displaying various types of content and data received from any of server systems 106 via network 100. Server systems 106 in turn may be configured to receive data related to user interaction with the web browsers or mobile browsers displayed in the user or client devices 102. The user interaction may occur at each device 102 through an interface provided on a webpage loaded within the browser executable at each device. It should be noted that server systems 106 may be implemented using a single server device or system or may refer to a combination of multiple servers. Additionally, a plurality of content provider servers 104 may be connected to the electronic network 100 and configured to receive a request from an instance of a publisher web page, executing in a user's browser, to fill available space on a web page of the publisher. In some embodiments, the content provider servers may match the request to a user with a virtual token and may provide specified content corresponding to the virtual token to fill the available space on a particular web page. The specified content may be able to "follow" the user from one platform to another using cross-device and/or cross-platform correlation technologies and the user inputs with respect to specified platforms. Further details with respect to targeting a user with specified content across platforms and publishers are provided in FIGS. 2-8.

Figure 2:
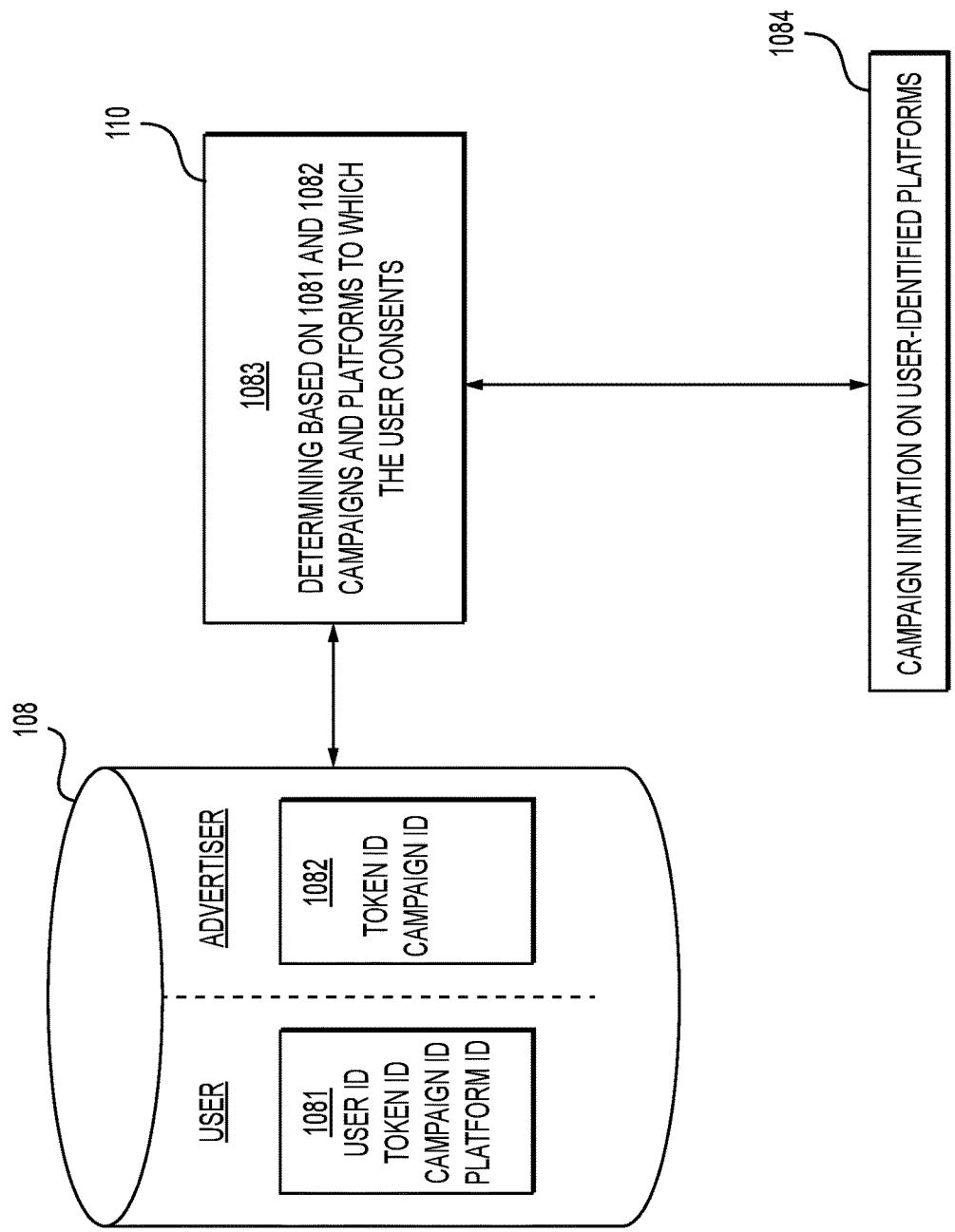
FIG. 2 shows a block diagram of an exemplary registry for targeting electronic content to a user, consistent with exemplary embodiments of the present disclosure.

As shown in FIG. 2, server system 106 may include one or more databases 108 and one or more processors 110. The combination of database 108 and processor 110 may also be referred to as a registry 106 that receives inputs to the database 108 and initiates actions at the processor 110 based on the input. In one embodiment, processor 110 may be configured to receive instructions and content from various sources including user or client devices 102 and store the received content within databases 108. In one embodiment, databases 108 may be any type of data store or recording medium that may be used to store any type of data. For example, databases 108 may store information related to user preferences for receiving desired content related to specific topics. Additionally, databases 108 may store demographic and metrics of target audiences for advertising, user profile data, advertising content, user-generated content, etc. In some implementations, data may be stored in the databases 108 in an encrypted form to increase security of the data against unauthorized access. The databases 108 may include user records 1081 comprising user data received by processor 110 from user devices 102, the user records 1081 comprising at least a user ID, campaign ID, token ID, and platform IDs. The processor 110 then compares these records 1081 to content provider data 1082 provided by the content providers and stored in databases 108 to determine the content campaign to display to the user and the platforms on which to do so, as further explained in FIGS. 3-8. Processor 110 or any additional processors within registry 106 may also be configured to provide content to client or user devices 102 for displaying based on a command from the content provider servers confirming the user is in possession of the virtual token associated with the campaign. The displayed content may include, for example, web content that has been processed or received with specified content related to the content provider. For example, processor 110 may transmit web page content including the specified content in place of traditional display advertising. In some embodiments, client devices 102 may be used by certain users to input or manage web content that is managed by processor 110. In one embodiment, processor 110 may be configured to send a command signal 1084 to initiate the specified content campaign as will be described in further detail below with respect to FIGS. 3-8.

Figure 3A:
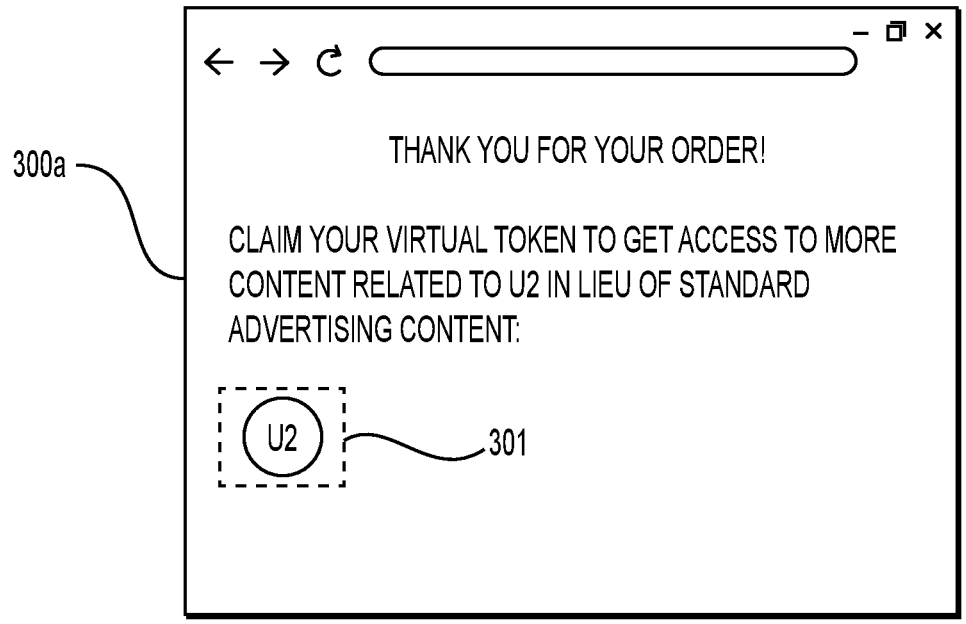
FIG. 3A is an exemplary screenshot of a graphical user interface for prompting a user to claim a virtual token, consistent with exemplary embodiments of the present disclosure.

FIG. 3A depicts an exemplary screenshot of a web page 300a on a user device 102 inviting a user to claim possession of a virtual token by selecting a virtual token link 301 after the user has taken an action that demonstrates an interest in the content provider. In the example shown in FIG. 3A, the user has just purchased tickets to a U2 concert, indicating interest in the band U2. In response, the virtual token link 301 is offered to the user via the user device 102. When the user accepts the virtual token, in this example by clicking on the virtual token link 301 shown on the webpage 300*a*, the user device 102 transmits to at least one database 108 of the registry 106 that the user has claimed the virtual token.

Figure 3B:
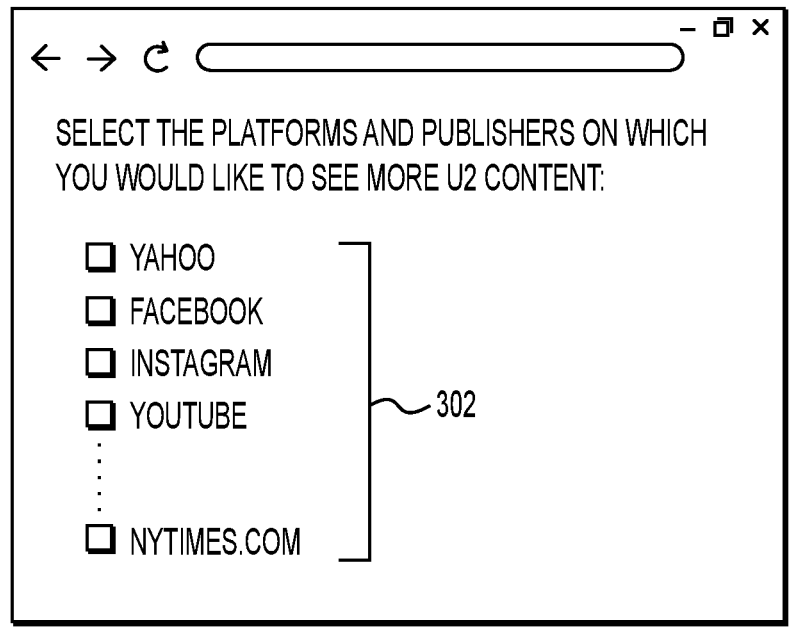
FIG. 3B is an exemplary screenshot of a graphical user interface for prompting a user to select the platforms on which the user consents to receive the targeted electronic content, consistent with exemplary embodiments of the present disclosure.

Once the user claims the virtual token by clicking on link 301, the user is directed to a second webpage 300*b* shown in FIG. 3B directing the user to select the platforms and publishers on which the user consents to having standard advertising replaced with specific content related to the campaign of the content provider. The user makes the selections on the webpage 300*b*, and each selection is recorded as a platform id and respectively paired with a user id corresponding to the user, a campaign id associated with the content provider, in this example U2, and a token id associated with the content campaign being conducted by the content provider, which may take the form of an advertising campaign for the content provider, to make a respective user record 1081. For example, if the user selects Yahoo and YouTube from the menu 302 on the webpage 300*b*, one record 1081 will be recorded and transmitted to at least one database 108 of registry 106 consisting of the user ID associated with the user, the campaign ID associated with U2, the token id associated with the token claimed by the user, and a platform id for Facebook. Another record 1081 will be recorded and transmitted to at least one database 108 consisting of the user ID associated with the user, the campaign ID associated U2, the token ID associated with the token claimed by the user, and a platform ID for YouTube.

Once the at least one database 108 of registry 106 receives the records 1081 from the user device 102, it may verify that the token ID is a valid token ID for the campaign ID. This may be done using processor 110 to transmit the token ID to the content provider server 104 to confirm that the token ID corresponds to a token issued for the content campaign. Alternatively, the content provider may transmit a content provider record 1082 to the database 108 that includes a list of the token ids associated with the campaign ID such that the processor 110 can be used to check that the token ID received in the user record 1081 corresponds to a token ID in the list in the content provider record 1082. If the campaign for the content provider is one with mined tokens, the processor 110 can also be used to perform a verification of proof of work, such as hashing and checking for trailing zeros, to verify that the token ID is a genuine token ID associated with the campaign.

Figure 4:
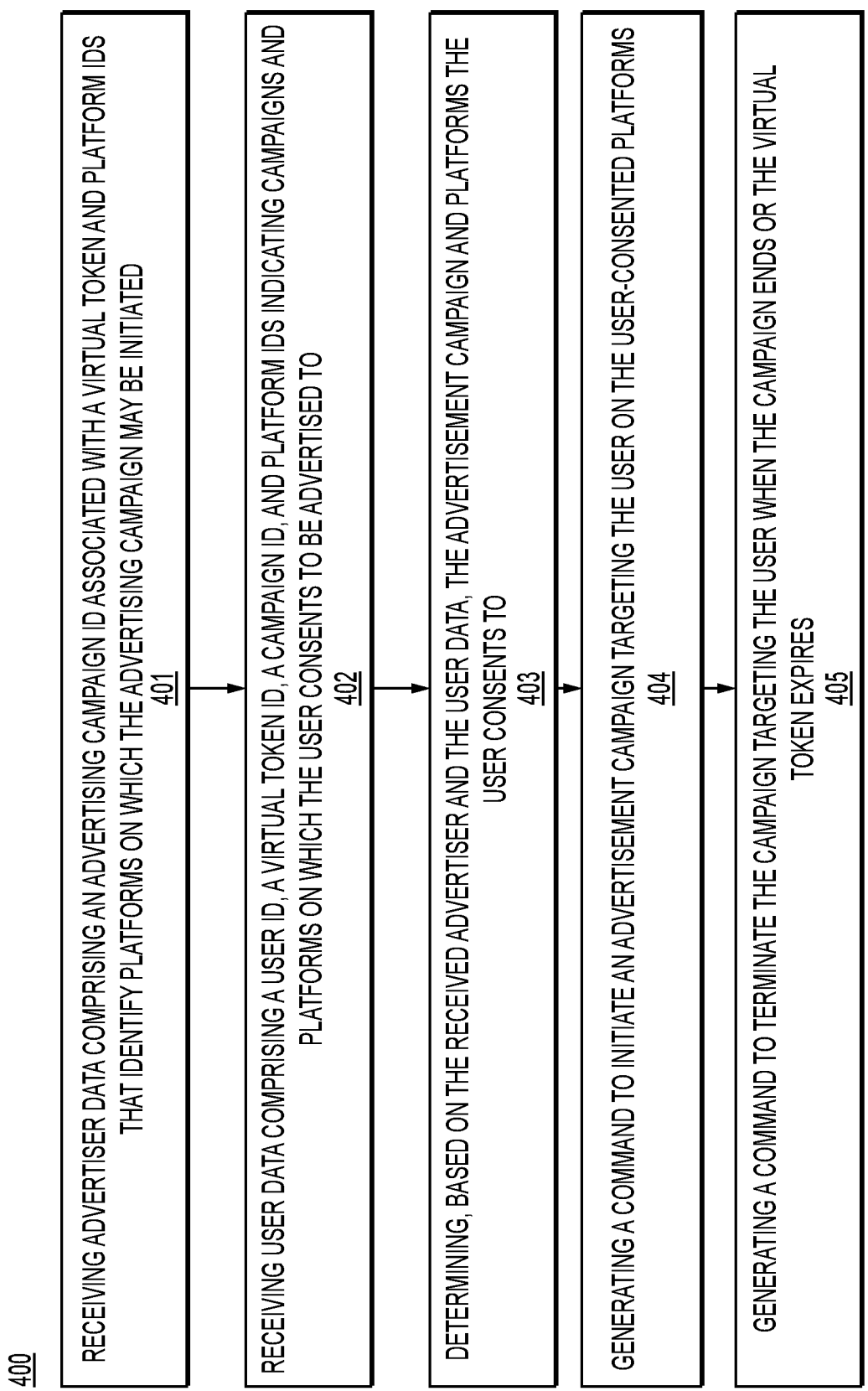
FIG. 4 is a flow diagram of an exemplary method for targeting electronic content to a user in an online electronic content targeting environment.

FIG. 4 is a flow diagram of a method 400 for performing the steps described with reference to FIG. 2 above and additional steps performed at the registry 106 to provide specified content to a user in possession of a virtual token. In further detail, as shown in FIG. 4, step 401 of method 400 includes receiving content provider data from the content provider comprising a campaign id identifying a content campaign, platform ids identifying platforms and publishers on which the campaign may be initiated and run, and optionally a list of token ids that are associated with the campaign. At step 402, the registry 106 may receive user data from a user device 102, such as in a manner described in FIGS. 3A and 3B, the user data being compiled into a record 1081 for each platform or publisher 112 the user selects, each record comprising a user id, a campaign id, a token id, and a platform id. As described above, a separate record 1081 is created for each platform or publisher selected by the user. At step 403, the server 106 matches the ids provided by the user at step 402 with those provided by the content provider at 401 to determine the campaign and platforms the user consents to. This step may include verification that the token id is a valid token id as described with reference to FIG. 2 above.

At step 404, the registry 106 generates a command to initiate a campaign targeting the user and communicates the command to each platform 112 selected such that when the user visits or interacts with those platforms or publishers on a user device 102, the standard advertising that may typically appear on a user interface is replaced with content specified in the campaign and associated with the content provider. This is maintained throughout the course of the campaign, the duration of the campaign being determined by the content provider, or until the user no longer has possession of the virtual token, or until the virtual token expires. The content provider may also determine the duration of the token, choosing a duration for the token that corresponds to the duration of the campaign, or choosing a duration that is more limited than that of the campaign. After the token expires or the campaign ends, the registry 106 generates a command to terminate the campaign targeting the user, as shown in step 405.

Figure 5:
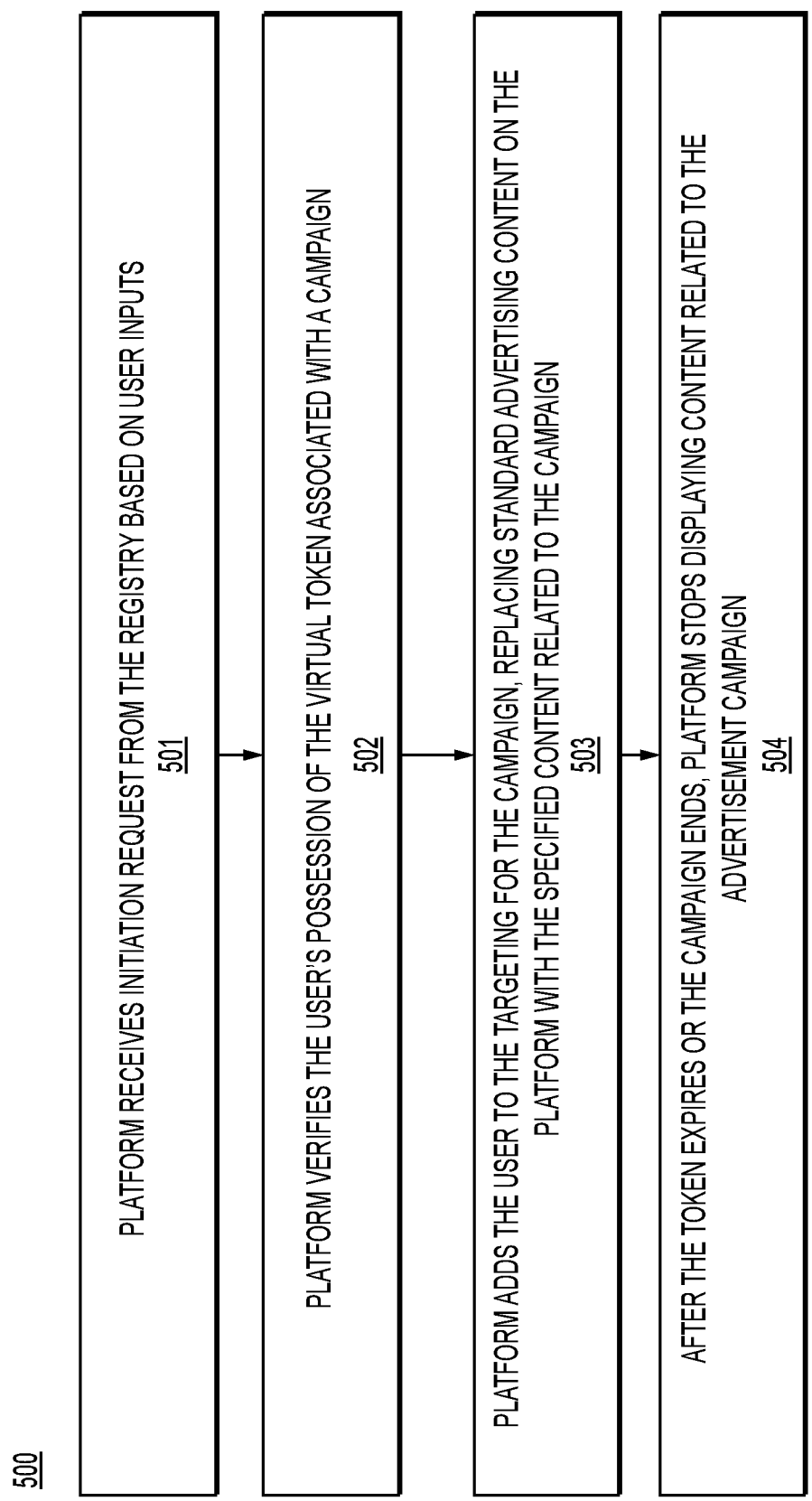
FIG. 5 is a flow diagram of a platform's interaction with the exemplary method for targeting electronic content to a user, consistent with exemplary embodiments of the present disclosure.

FIG. 5 is a flow diagram illustrating the method 500 for providing specified content from the perspective of actions initiated and taken at the platforms 112. In further detail, as shown in FIG. 5, the platforms or publishers receive an initiation request at step 501 from the servers after step 404 shown in FIG. 4, the initiation request including information about the user to be targeted by the campaign, the content provider that is providing the content for the campaign, and information regarding the virtual token associated with the campaign and the user. At step 502, the platform verifies that the virtual token is valid, either by confirming that the registry 106 has already validated the token or by contacting the content provider to validate the token independently. Once the validity of the token is ascertained, the platform then adds the user to a list of users to be targeted by the campaign, as shown in step 503.

When the user is added to the targeting list, the platform will replace standard advertising content that would typically be displayed on the platform with specified content related to the campaign. This is maintained throughout the course of the campaign, the duration of the campaign being determined by the content provider, or until the user no longer has possession of the virtual token, or until the virtual token expires. The content provider may also determine the duration of the token, choosing a duration for the token that corresponds to the duration of the campaign, or choosing a duration that is more limited than that of the campaign. After the token expires or the campaign ends, the platform or publisher receives a command to terminate the campaign targeting the user, as shown in step 504, and stops displaying content related to the campaign and resumes displaying standard advertising content.

Figure 6:
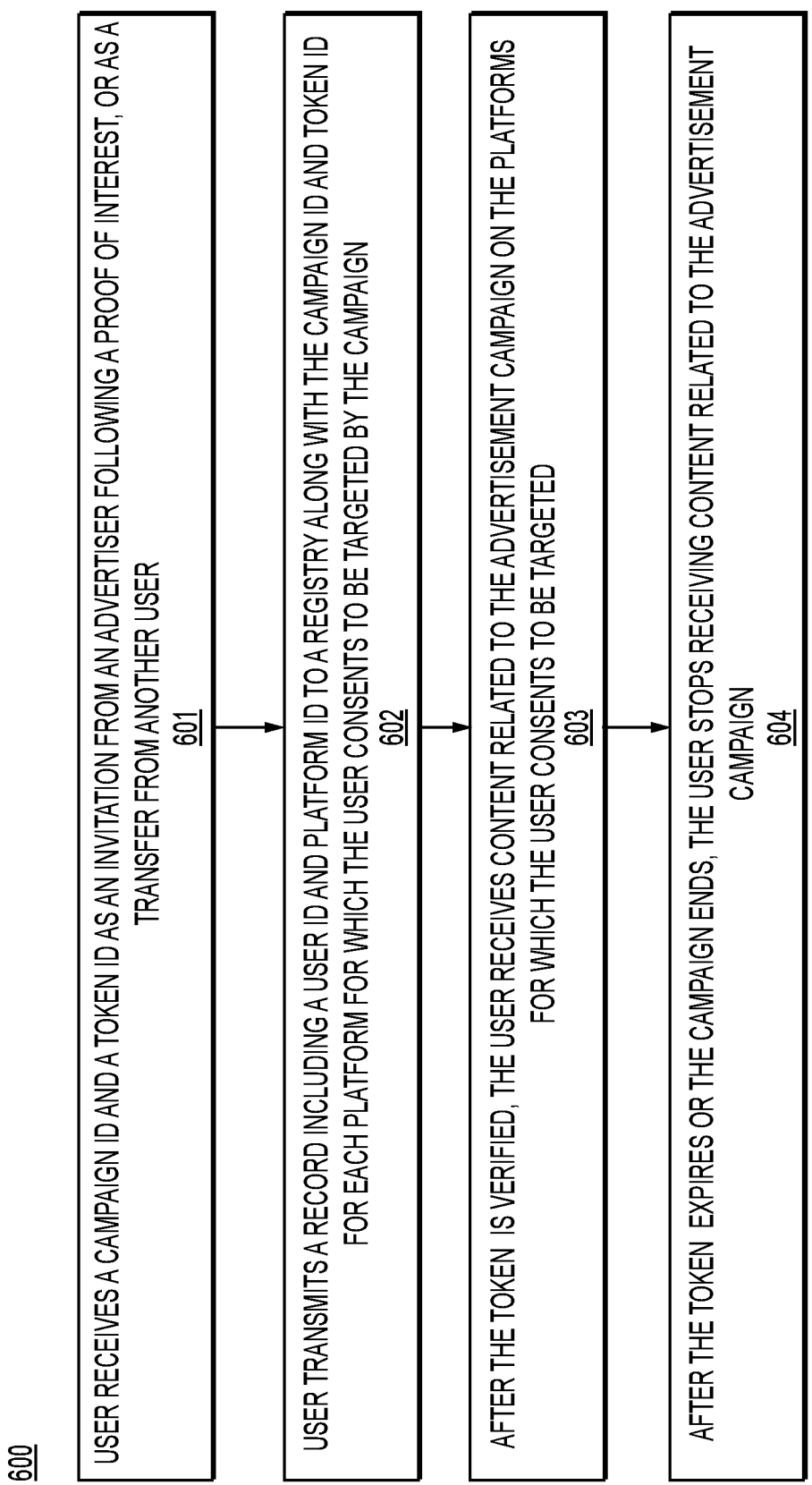
FIG. 6 is a flow diagram of a user's interaction with the exemplary method for targeting electronic content to a user, consistent with exemplary embodiments of the present disclosure.

FIG. 6 is a flow diagram illustrating the method 600 for providing specified content from the perspective of actions initiated and taken by a user. In further detail, as shown in FIG. 6, a user receives a virtual token at step 601 following either a proof of interest triggering event or as a transfer from another user. The proof of interest triggering events may include purchasing tickets to an event, attendance at an event, purchasing an item, tagging (e.g., liking) of a particular topic on social media, etc. Once the user takes possession of a virtual token, either by claiming it from a content provider or as a transfer from another user, the user then selects the platforms on which the user consents to receiving specified content in lieu of standard advertising content, as described with reference to FIGS. 3A and 3B above. For each platform or publisher the user selects, a separate record 1084 is created and transmitted to the databases 108 in step 602.

After the record is transmitted from a user device 102 to the database 108 in registry 106, the registry 106 will transmit a request to the content provider servers 104 to add the user to the user list to be targeted by the campaign. After these steps are completed, the user will begin receiving the specified content on their user devices 102 in lieu of standard advertising content when accessing the webpages or graphical user interfaces of the platforms or publishers selected, as described in step 603. This is maintained throughout the course of the campaign, the duration of the campaign being determined by the content provider, or until the user no longer has possession of the virtual token, or until the virtual token expires as described above. The content provider may also determine the duration of the token, choosing a duration for the token that corresponds to the duration of the campaign, or choosing a duration that is more limited than that of the campaign. After the token expires or the campaign ends, the platform or publisher receives a command to terminate the campaign targeting the user, as shown in step 504 in FIG. 5, and the user stops receiving content related to the campaign and resumes displaying standard advertising content, as shown in step 604.

Figure 7:
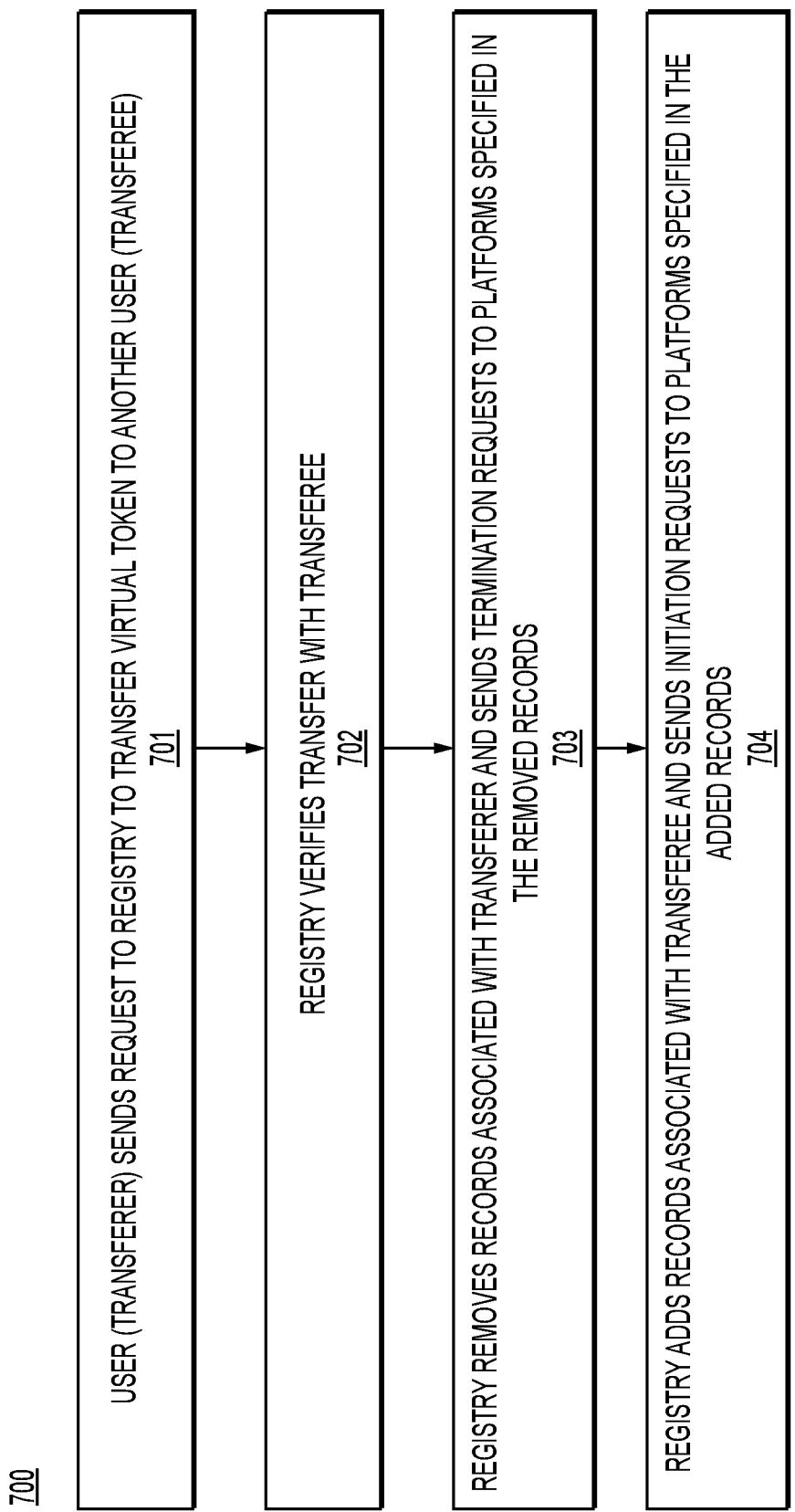
FIG. 7 is a flow diagram of a transfer of a virtual token between users, consistent with exemplary embodiments of the present disclosure.

FIG. 7 illustrates an exemplary flow diagram for a method of removing a first user, or transferor, from a campaign and replacing with a second user, or transferee, in response to the first user transferring the virtual token to the second user. If a user decides to send a virtual token to an interested friend, the user may input on a user device 102 a transfer request to send the virtual token to a second user, as described in step 701. The second user may be prompted to accept or refuse the transfer. This may take the form of a notification sent from the processor 110 of the registry to the second user verifying the transfer, as shown in step 702. If the transfer is accepted by the second user, the records 1084 associated with the first user and the campaign associated with the token are removed from the databases 108 and the processor 110 sends termination requests to the platforms 112 to stop targeting the first user with the content campaign, as shown in step 703. Instead, as shown in step 704, the second user, or transferee, has their records added to the databases 108 of registry 106, and processor 110 sends initiation requests to the platforms 112 selected by the transferee, the selection being made in a like manner as that of the first user as described with reference to FIGS. 3A and 3B.

Figure 8:
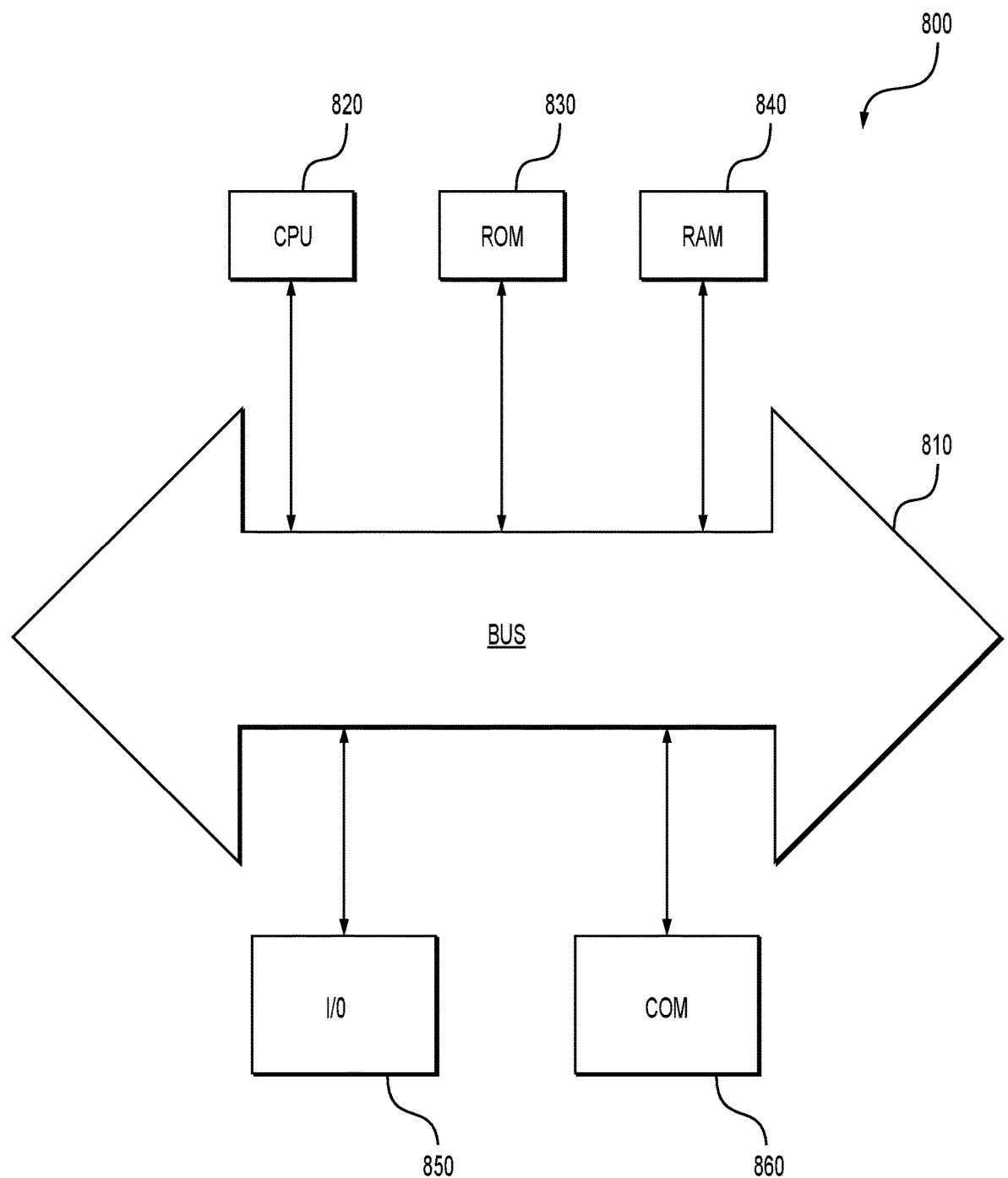
FIG. 8 is a simplified functional block diagram of a computer and/or server that may be configured as a device or system providing specified content in an online advertising environment, according to an exemplary embodiment of the present disclosure.

FIG. 8 illustrates a high-level functional block diagram of an exemplary computer system 800, in which embodiments of the present disclosure, or portions thereof, may be implemented, e.g., as computer-readable code. For example, each of the exemplary devices and systems described above with respect to FIG. 1 can be implemented in computer system 800 using hardware, software, firmware, tangible computer readable media having instructions stored thereon, or a combination thereof and may be implemented in one or more computer systems or other processing systems. Hardware, software, or any combination of such may embody any of the modules and components in FIG. 1, as described above.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the present disclosure, as described above in the examples of FIGS. 1-7 may be implemented using computer system 800, shown in FIG. 8. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 8, computer system 800 includes a central processing unit (CPU) 820. CPU 820 may be any type of processor device including, for example, any type of special purpose or a general-purpose microprocessor device. As will be appreciated by persons skilled in the relevant art, CPU 820 also may be a single processor in a multi-core/multiprocessor system, such system operating alone, or in a cluster of computing devices operating in a cluster or server farm. CPU 820 is connected to a data communication infrastructure 810, for example, a bus, message queue, network, or multi-core message-passing scheme.

Computer system 800 also includes a main memory 840, for example, random access memory (RAM), and may also include a secondary memory 830. Secondary memory 830, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc. which is read by and written to by the removable storage drive. As will be appreciated by persons skilled in the relevant art, such a removable storage unit generally includes a computer usable storage medium having stored therein computer software and/or data.

In alternative implementations, secondary memory 830 may include other similar means for allowing computer programs or other instructions to be loaded into computer system 800. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to computer system 800.

Computer system 800 may also include a communications interface ("COM") 860. Communications interface 860 allows software and data to be transferred between computer system 800 and external devices. Communications interface 860 may include a modem, a network interface (such as an Ethernet card), a communications port, a PCM-CIA slot and card, or the like. Software and data transferred via communications interface 860 may be in the form of signals, which may be electronic, electromagnetic, optical, or other signals capable of being received by communications interface 860. These signals may be provided to communications interface 860 via a communications path of computer system 800, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. Computer system 800 also may include input and output ports 850 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

It would also be apparent to one of skill in the relevant art that the present disclosure, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

It is to be understood that both the foregoing general description and the following detailed description are exemplary and explanatory only and are not restrictive of the disclosed embodiments, as claimed.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for targeting content to a user having a virtual token, the method comprising:
receiving, using at least one processor, electronic content data associated with an electronic content provider, the electronic content data comprising:
a content campaign identification that identifies a content campaign associated with the virtual token, and
content provider-identified platform identifications that identify platforms on which the content campaign may be initiated;
generating, using the at least one processor, a first graphical user interface;
receiving, using the at least one processor and from a user interaction with the first graphical user interface, user data from the user comprising a virtual token identification that indicates that the user is in possession of the virtual token, the virtual token identification associated with the virtual token and the virtual token having an expiration date,
generating, using the at least one processor, a second graphical user interface based on the user interaction with the first graphical user interface;
receiving, using the at least one processor and from a user interaction with the second graphical user interface, user data from the user comprising user-identified platform identifications that identify the platforms on which the user consents to be targeted by the content campaign;
receiving, using the at least one processor, user data comprising:
a user identification that identifies the user, and
the content campaign identification that identifies the content campaign associated with the virtual token;
determining, using the at least one processor, based on the received electronic content data and the received user data, the content campaign and the platforms the user consents to;
generating, using the at least one processor, a notification to initiate the content campaign targeting the user on the platforms on which the user consents to be targeted; and
outputting, before the expiration date of the virtual token, the generated notification to the platforms on which the user consents to be targeted.

2. The method as recited in claim 1, wherein the virtual token is associated with specified content from the content provider, and wherein the content campaign targeting the user comprises generating a notification to display the specified content on the platforms on which the user consents.

3. The method as recited in claim 1, wherein the determining step further includes verifying an authenticity of the virtual token associated with the content campaign.

4. The method as recited in claim 3, wherein verifying the authenticity of the virtual token associated with the content campaign includes contacting the content provider associated with the content campaign to confirm a validity of the virtual token.

5. The method as recited in claim 3, wherein verifying the authenticity of the virtual token associated with the content campaign includes checking the virtual token identification against a record provided by the content provider.

6. The method as recited in claim 3, wherein verifying the authenticity of the virtual token associated with the content campaign includes hashing and checking for trailing zeros.

7. The method as recited in claim 1, further including receiving a termination request when the virtual token expires, and removing the user from targeting for the content campaign in response to the termination request.

8. The method as recited in claim 1, further including receiving a termination request when the content campaign ends, and removing the user from targeting for the content campaign in response to the termination request.

9. The method recited in claim 1, wherein the user may transfer the virtual token to a transferee, wherein the method further includes:
receiving a transfer request identifying the user transferring the virtual token and the transferee receiving the virtual token,
removing the user from the content campaign,
receiving, using the at least one processor, transferee data associated with the transferee; the transferee data comprising:
a transferee user identification that identifies the transferee,
a transferee virtual token identification that indicates that the transferee is in possession of the virtual token associated with the content campaign,
a transferee campaign identification that identifies the content campaign associated with the virtual token, and
transferee-identified platform identifications that identify the platforms on which the transferee consents to be targeted;
determining, based on the received transferee data, the content campaign and the platforms the transferee consents to; and
initiating a content campaign targeting the transferee on the platforms on which the transferee consents to be targeted.

10. A system for providing targeted content to a user having a virtual token, the system comprising:
a data storage device storing instructions;
at least one processor configured to execute the instructions to perform a method comprising:
receiving, using at least one processor, electronic content data associated with an electronic content provider, the electronic content data comprising:
a content campaign identification that identifies a content campaign associated with the virtual token, and
content provider-identified platform identifications that identify platforms on which the content campaign may be initiated;
generating, using the at least one processor, a first graphical user interface;
receiving, using the at least one processor and from a user interaction with the first graphical user interface, user data from the user comprising a virtual token identification that indicates that the user is in possession of the virtual token, the virtual token identification associated with the virtual token and the virtual token having an expiration date,
generating, using the at least one processor, a second graphical user interface based on the user interaction with the first graphical user interface;
receiving, using the at least one processor and from a user interaction with the second graphical user interface, user data from the user comprising user-identified platform identifications that identify the platforms on which the user consents to be targeted by the content campaign;
receiving, using the at least one processor, user data comprising:
a user identification that identifies the user, and
the content campaign identification that identifies the content campaign associated with the virtual token;
determining, using the at least one processor, based on the received electronic content data and the received user data, the content campaign and the platforms the user consents to;
generating, using the at least one processor, a notification to initiate the content campaign targeting the user on the platforms on which the user consents to be targeted; and
outputting, before the expiration date of the virtual token, the generated notification to the platforms on which the user consents to be targeted.

11. The system of claim 10, wherein the virtual token is associated with specified content from the content provider, and wherein the content campaign targeting the user comprises generating a notification to display the specified content on the platforms on which the user consents to.

12. The system of claim 10, wherein the determining step further includes verifying an authenticity of the virtual token associated with the content campaign.

13. The system of claim 12, wherein verifying the authenticity of the virtual token associated with the content campaign includes contacting the content provider associated with the content campaign to confirm a validity of the virtual token.

14. The system of claim 12, wherein verifying the authenticity of the virtual token associated with the content campaign includes checking the virtual token identification against a record provided by the content provider.

15. The system of claim 12, wherein verifying the authenticity of the virtual token associated with the content campaign includes hashing and checking for trailing zeros.

16. The system of claim 10, wherein the user may transfer the virtual token to a transferee, wherein the method further includes:
receiving a transfer request identifying the user transferring the virtual token and the transferee receiving the virtual token,
removing the user from the content campaign,
receiving, using the at least one processor, transferee data associated with the transferee; the transferee data comprising:
a transferee user identification that identifies the transferee,
a transferee virtual token identification that indicates that the transferee is in possession of the virtual token associated with the content campaign,
a transferee campaign identification that identifies the content campaign associated with the virtual token, and
transferee-identified platform identifications that identify the platforms on which the transferee consents to be targeted;
determining, based on the received transferee data, the content campaign and the platforms the transferee consents to; and
initiating a content campaign targeting the transferee on the platforms on which the transferee consents to be targeted.

17. A non-transitory computer-readable medium storing instructions, the instructions, when executed by a computer system cause the computer system to perform a method, the method comprising:

receiving, using at least one processor, electronic content data associated with an electronic content provider, the electronic content data comprising:
- a content campaign identification that identifies a content campaign associated with a virtual token, and
- content provider-identified platform identifications that identify platforms on which the content campaign may be initiated;

generating, using the at least one processor, a first graphical user interface;

receiving, using the at least one processor and from a user interaction with the first graphical user interface, user data from the user comprising a virtual token identification that indicates that the user is in possession of the virtual token, the virtual token identification associated with the virtual token and the virtual token having an expiration date, generating, using the at least one processor, a second graphical user interface based on the user interaction with the first graphical user interface;

receiving, using the at least one processor and from a user interaction with the second graphical user interface, user data from the user comprising user-identified platform identifications that identify the platforms on which the user consents to be targeted by the content campaign;

receiving, using the at least one processor, user data comprising:
- a user identification that identifies the user, and
- the content campaign identification that identifies the content campaign associated with the virtual token;

determining, using the at least one processor, based on the received electronic content data and the received user data, the content campaign and the platforms the user consents to;

verifying an authenticity of the virtual token associated with the content campaign by hashing and checking for trailing zeros;

generating, using the at least one processor, a notification to initiate the content campaign targeting the user on the platforms on which the user consents to be targeted; and outputting, before the expiration date of the virtual token, the generated notification to the platforms on which the user consents to be targeted.

18. The non-transitory computer-readable medium of claim 17, wherein the virtual token is associated with specified content from the content provider, and wherein the content campaign targeting the user comprises generating a notification to display the specified content on the platforms on which the user consents to.

19. The non-transitory computer-readable medium of claim 17, wherein the user may transfer the virtual token to a transferee, wherein the method further includes:
- receiving a transfer request identifying the user transferring the virtual token and the transferee receiving the virtual token,
- removing the user from the content campaign,
- receiving, using the at least one processor, transferee data associated with the transferee; the transferee data comprising:
  - a transferee user identification that identifies the transferee,
  - a transferee virtual token identification that indicates that the transferee is in possession of the virtual token associated with the content campaign,
  - a transferee campaign identification that identifies the content campaign associated with the virtual token, and
  - transferee-identified platform identifications that identify the platforms on which the transferee consents to be targeted;
- determining, based on the received transferee data, the content campaign and the platforms the transferee consents to; and
- initiating a content campaign targeting the transferee on the platforms on which the transferee consents to be targeted.

* * * * *